US007908520B2

(12) United States Patent
Avizienis

(10) Patent No.: US 7,908,520 B2
(45) Date of Patent: Mar. 15, 2011

(54) SELF-TESTING AND -REPAIRING FAULT-TOLERANCE INFRASTRUCTURE FOR COMPUTER SYSTEMS

(75) Inventor: Algirdas Avizienis, Santa Monica, CA (US)

(73) Assignee: A. Avizienis and Associates, Inc., Santa Monica, CA (US)

( * ) Notice: Subject to any disclaimer, the term of this patent is extended or adjusted under 35 U.S.C. 154(b) by 1344 days.

(21) Appl. No.: 09/886,959

(22) Filed: Jun. 20, 2001

(65) Prior Publication Data

US 2002/0046365 A1    Apr. 18, 2002

(51) Int. Cl.
*G06F 11/00* (2006.01)
(52) U.S. Cl. ......................................................... 714/30
(58) Field of Classification Search .................. 714/1, 2, 714/22, 30, 38
See application file for complete search history.

(56) References Cited

U.S. PATENT DOCUMENTS

| 3,167,685 | A | * | 1/1965 | Bade et al. | 361/56 |
| 3,665,173 | A | * | 5/1972 | Bouricius et al. | 714/11 |
| 3,757,302 | A | * | 9/1973 | Pollitt | 714/22 |
| 4,031,372 | A | * | 6/1977 | Davis | 700/287 |
| 4,323,966 | A | * | 4/1982 | Whiteside et al. | 714/1 |
| 4,419,737 | A | * | 12/1983 | Yamaura et al. | 713/500 |
| 4,995,040 | A | * | 2/1991 | Best et al. | 714/797 |
| 5,315,161 | A | * | 5/1994 | Robinson et al. | 307/66 |
| 5,339,404 | A | * | 8/1994 | Vandling, III | 714/1 |
| 5,448,721 | A | * | 9/1995 | Kaneko | 714/712 |
| 5,452,443 | A | * | 9/1995 | Oyamada et al. | 714/10 |
| 5,498,975 | A | * | 3/1996 | Cliff et al. | 326/10 |
| 5,515,282 | A | * | 5/1996 | Jackson | 701/4 |
| 5,524,212 | A | * | 6/1996 | Somani et al. | 711/121 |
| 5,606,511 | A | * | 2/1997 | Yach | 702/64 |
| 5,751,726 | A | * | 5/1998 | Kim | 714/709 |
| 5,834,856 | A | * | 11/1998 | Tavallaei et al. | 307/64 |
| 5,911,038 | A | * | 6/1999 | Jones | 714/1 |
| 5,929,783 | A | * | 7/1999 | King et al. | 340/870.05 |
| 5,987,639 | A | * | 11/1999 | Kivari et al. | 714/822 |
| 6,269,450 | B1 | * | 7/2001 | Iwata et al. | 713/340 |
| 6,304,981 | B1 | * | 10/2001 | Spears et al. | 714/24 |
| 6,754,846 | B2 | * | 6/2004 | Rasmussen et al. | 714/11 |
| 2003/0208283 | A1 | * | 11/2003 | Vasko et al. | 700/21 |

OTHER PUBLICATIONS

Avizienis, Algirdas "The Hundred Year Spacecraft" IEEE Jul. 19, 1999.*
Intel Corp., Intel's Quality System Databook (Jan. 1998), Order No. 210997-007.
A. Avizienis and Y. He, "Microprocessor entomology: A taxonomy of design faults in COTS microprocessors", in J. Rushby and C. B. Weinstock, editors, Dependable Computing for Critical Applications 7, IEEE Computer Society Press (1999).

(Continued)

*Primary Examiner* — Bryce P Bonzo
(74) *Attorney, Agent, or Firm* — Peter I. Lippman

(57) ABSTRACT

ASICs or like fabrication-preprogrammed hardware provide controlled power and recovery signals to a computing system that is made up of commercial, off-the-shelf components—and that has its own conventional hardware and software fault-protection systems, but these are vulnerable to failure due to external and internal events, bugs, human malice and operator error. The computing system preferably includes processors and programming that are diverse in design and source. The hardware infrastructure uses triple modular redundancy to test itself as well as the computing system, and to remove failed elements—powering up and loading data into spares. The hardware is very simplified in design and programs, so that bugs can be thoroughly rooted out. Communications between the protected system and the hardware are protected by very simple circuits with duplex redundancy.

1 Claim, 10 Drawing Sheets

OTHER PUBLICATIONS

A. Avizienis and J. P. J. Kelly, "Fault tolerance by design diversity: concepts and experiments", Computer, 17(8):67-80 (Aug. 1984).

A. Avizienis, "The N-version approach to fault-tolerant software", IEEE Trans. Software Eng., SE11(12):1491-1501 (Dec. 1985).

M. K. Joseph and A. Avizienis, "Software fault tolerance and computer security: A shared problem", in Proc. of the Annual National Joint Conference and Tutorial on Software Quality and Reliability, pp. 428-436 (Mar. 1989).

Y. He, An Investigation of Commercial Off-the-Shelf (COTS) Based Fault Tolerance, PhD thesis, Computer Science Department, University of California, Los Angeles (Sep. 1999).

Y. He and A. Avizienis, "Assessment of the applicability of COTS microprocessors in high-confidence computing systems: A case study", in Proceedings of ICDSN 2000 (Jun. 2000).

Intel Corp., The Pentium II Xeon Processor Server Platform System Management Guide (Jun. 1998), Order No. 243835 001.

A. Avizienis, G. C. Gilley, F. P. Mathur, D. A. Rennels, J. A. Rohr, and D. K. Rubin. "The STAR (Self-Testing-and-Repairing) computer: An investigation of the theory and practice of fault-tolerant computer design", IEEE Trans. Comp., C 20(11):1312-21 (Nov. 1971).

T. B. Smith, "Fault-tolerant clocking system", in Digest of FTCS-11, pp. 262-264 (Jun. 1981).

Intel Corp., P6 Family Of Processors Hardware Developer's Manual (Sep. 1998), Order No. 244001 001.

A. Avizienis, "Toward systematic design of fault-tolerant systems", Computer, 30(4):51-58 (Apr. 1997).

"Special report: Sending astronauts to Mars", Scientific American, 282 (3):40-63 (Mar. 2000).

NASA, "Conference on enabling technology and required scientific developments for interstellar missions", OSS Advanced Concepts Newsletter, p. 3 (Mar. 1999).

* cited by examiner

Figure 8a: Power-On Sequence for the M-Cluster, Controlled by S3-Nodes

(1) S3 nodes switch Power On (Signal 730) for M-node #1, command BIST (Built In Self Test) by signal 725.

(2a) If BIST is OK, keep Power On for #1.

(2b) If BIST fails, Power Off for #1.

(2) The S3 nodes record status ("Good" or "Failed") for #1 in the M-Cluster Status Register MC-SR (705a, 705b).

(3) Repeat steps (1)-(3) until 3 good M-nodes are found, or all M-nodes have been tested, and only 1 or 2 good M-nodes exist.

(4) After 3 good M-nodes are found, Power Off each remaining "Good" node after BIST, record Status as "Spare" in MC-SR.

(6) After all M-nodes have been tested, transfer MC-SR contents (724) via the IC-Bus (602) to the powered good M-nodes.

(7) *Command* TMR, Duplex, or Simplex operation (726) to the M-Cluster. If no good M-nodes were found, send "M-Cluster dead" message (728) to operator.

(8) Switch Power On (729) for all A-nodes (at once). The Inner Ring is now powered and the remaining Power-On steps are controlled by the M-nodes in TMR, Duplex, or Simplex configuration.

(9) Send "Power On in Outer Ring" Command (727) to the M-Cluster.

Figure 8 b: Power-On Sequence for the Outer Ring (one node), Controlled by M-Cluster This sequence is initiated by the "Power On in Outer Ring" command 727.

(1) Send the "Reset A-pair" command via the M-Bus to A-pair #1.

(2a) If Reset succeeds, "All is well" is received from A-pair #1 and Power On command is sent to the Power Switch of C-node (or D-node) #1. The Power-On command includes C-node (or D-node) BIST command as well.

(2b) If Reset fails, record "Failed" status for C-node #1 in their Outer Ring Status Registers OR-SR (504) of M-nodes, go to (1) for A-pair #2.

(3a) If Power On and BIST both succeed, the M-nodes record "C-node #1 is good" in their OR-SR (504), go to (1) for A-pair #2.

(3b) If either the Power Switch fails to switch on, or BIST fails after power is switched on, record "Failed" in OR-SR for C-node #1., command Power Off if BIST failed, go to (1) for A-pair #2.

Figure 8c: Power-Off Sequence for DiSTARS (1) S3 nodes switch Power Off (729) for all A-nodes (at once), start Interval Timer (703a).

(2) Removal of A-node power puts the power switches of all C-nodes and D-nodes in the Off position.

(3) S3 nodes switch Power Off (730) for the M-nodes.

SELF-TESTING AND -REPAIRING FAULT-TOLERANCE INFRASTRUCTURE FOR COMPUTER SYSTEMS

BACKGROUND

1. Field of the Invention

This invention relates generally to robustness (resistance to failure) in computer systems; and more particularly to novel apparatus and methods for shielding and preserving computer systems—which can be substantially conventional systems—from failure.

2. Related Art (a) Earlier publications—Listed below, and wholly incorporated by reference into the present document, are earlier materials in this field that will be helpful in orienting the reader. Cross-references to these publications, by number in the following list, appear enclosed in square brackets in the present document:

[1] Intel Corp., *Intel's Quality System Databook* (January 1998), Order No. 210997-007.
[2] A. Aviži̇enis and Y. He, "Microprocessor entomology: A taxonomy of design faults in COTS microprocessors", in J. Rushby and C. B. Weinstock, editors, *Dependable Computing for Critical Applications* 7, IEEE Computer Society Press (1999).
[3] A. Aviži̇enis and J. P. J. Kelly, "Fault tolerance by design diversity: concepts and experiments", Computer, 17(8):67-80 (August 1984).
[4] A. Aviži̇enis, "The N-version approach to fault-tolerant software", IEEE Trans. Software Eng., SE11(12):1491-1501 (December 1985).
[5] M. K. Joseph and A. Aviži̇enis, "Software fault tolerance and computer security: A shared problem", in *Proc. of the Annual National Joint Conference and Tutorial on Software Quality and Reliability*, pages 428-36 (March 1989).
[6] Y. He, *An Investigation of Commercial Off-the-Shelf (COTS) Based Fault Tolerance*, PhD thesis, Computer Science Department, University of California, Los Angeles (September 1999).
[7] Y. He and A. Aviži̇enis, "Assessment of the applicability of COTS microprocessors in high-confidence computing systems: A case study", in *Proceedings of ICDSN* 2000 (June 2000).
[8] Intel Corp., *The Pentium II Xeon Processor Server Platform System Management Guide* (June 1998), Order No. 243835-001.
[9] A. Aviži̇enis, G. C. Gilley, F. P. Mathur, D. A. Rennels, J. A. Rohr, and D. K. Rubin. "The STAR (Self-Testing-and-Repairing) computer: An investigation of the theory and practice of fault-tolerant computer design", *IEEE Trans. Comp.*, C-20(11):1312-21 (November 1971).
[10] T. B. Smith, "Fault-tolerant clocking system", in *Digest of FTCS*-11, pages 262-64 (June 1981).
[11] Intel Corp., *P6 Family Of Processors Hardware Developer's Manual* (September 1998), Order No. 244001-001.
[12] A. Aviži̇enis, "Toward systematic design of fault-tolerant systems", *Computer*, 30(4):51-58 (April 1997).
[13] "Special report: Sending astronauts to Mars", *Scientific American*, 282(3):40-63 (March 2000).
[14] NASA, "Conference on enabling technology and required scientific developments for interstellar missions", *OSS Advanced Concepts Newsletter*, page 3 (March 1999).

(b) Failure of computer systems—The purpose of a computer system is to deliver information processing services according to a specification. Such a system is said to "fail" when the service that it delivers stops or when it becomes incorrect, that is, it deviates from the specified service.

There are five major causes of system failure ("F"):
(F1) permanent physical failures (changes) of its hardware components [1];
(F2) interference with the operation of the system by external environmental factors, such as cosmic rays, electromagnetic radiation, excessive temperature, etc.;
(F3) previously undetected design faults (also called "bugs", "errata", etc.) in the hardware and software components of a computer system that manifest themselves during operation [2-4];
(F4) malicious actions by humans that cause the cessation or alteration of correct service: the introduction of computer "viruses", "worms", and other kinds of software that maliciously affects system operation [5]; and
(F5) unintentional mistakes by human operators or maintenance personnel that lead to the loss or undesirable changes of system service.

Commercial-off-the-shelf ("COTS") hardware components (memories, microprocessors, etc.) for computer systems have a low probability of failure due to failure mode F1 above [1]. They contain, however, very limited protection, or none at all, against causes F2 through F5 listed above [6, 7].

Accordingly the related art remains subject to major problems, and the efforts outlined in the cited publications—though praiseworthy—have left room for considerable refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of its first major independent facet or aspect, the invention is apparatus for deterring failure of a computing system. (The term "deterring" implies that the computing system is rendered less probable to fail, but there is no absolute prevention or guarantee.) The apparatus includes an exclusively hardware network of components, having substantially no software.

The apparatus also includes terminals of the network for connection to the system. In certain of the appended claims, this relationship is described as "connection to such system".

(In the accompanying claims generally the term "such" is used, instead of "said" or "the", in the bodies of the claims, when reciting elements of the claimed invention, for referring back to features which are introduced in preamble as part of the context or environment of the claimed invention. The purpose of this convention is to aid in more distinctly and emphatically pointing out which features are elements of the claimed invention, and which are parts of its context—and thereby to more particularly claim the invention.)

The apparatus includes fabrication-preprogrammed hardware circuits of the network for guarding the system from failure. For purposes of this document, the term "fabrication-preprogrammed hardware circuit" means an application-specific integrated circuit (ASIC) or equivalent.

This terminology accordingly encompasses two main types of hardware:
(1) a classical ASIC—i. e. a unitary, special-purpose processor circuit, sometimes called a "sequencer", fabricated in such a way that it substantially can perform only one program (though the program can be extremely complex, with many conditional branches and loops etc.); and (2) a general-purpose processor interlinked with a true read-only memory (ROM)—"true read-only" in the sense that the memory circuit and its contents substantially cannot be changed without destroying it—the memory circuit being fabricated in such a way that it contains only one program (again, potentially quite complicated), which the processor performs.

Ordinarily either of these device types when powered up starts to execute its program—which in essence is unalterably preprogrammed into the device at the time of manufacture. The program in the second type of device configuration identified above, in which the processor reads out the program from an identifiably separate memory, is sometimes termed "firmware"; however, when a true ROM is used, the distinction between firmware and ASIC is strongly blurred.

The term "fabrication-preprogrammed hardware circuit" also encompasses all other kinds of circuits (including optical) that follow a program which is substantially permanently manufactured in. In particular this nomenclature explicitly encompasses any device so described, whether or not in existence at the time of this writing.

The foregoing may represent a description or definition of the first aspect or facet of the invention in its broadest or most general form. Even as couched in these broad terms, however, it can be seen that this facet of the invention importantly advances the art.

In particular, through use of a protective system that is itself all hardware the probability of failure by previously mentioned failure (F1), (F2), (F4) and (F5) in the protective system itself is very greatly reduced. Furthermore the probability of failure by cause (F3) is rendered controllable by use of extremely simple hardware designs that can be qualified quite completely. While these considerations alone cannot eliminate the possibility of failure in the guarded computing system, they represent an extremely important advance in that at least the protective system itself is very likely to be available to continue its protective efforts.

Although the first major aspect of the invention thus significantly advances the art, nevertheless to optimize enjoyment of its benefits preferably the invention is practiced in conjunction with certain additional features or characteristics. In particular, if the computing system is substantially exclusively made up of substantially commercial, off-the-shelf components, preferably at least one of the network terminals is connected to receive at least one error signal generated by the computing system in event of incipient failure of that system; and at least one of the network terminals is connected to provide at least one recovery signal to the system upon receipt of the error signal.

If that preference is observed, then a subsidiary preference arises: preferably the circuits include portions that are fabrication-preprogrammed to evaluate the "at least one" error signal to establish characteristics of the at least one recovery signal. In other words, these circuits select or fashion the recovery signal in view of the character of the error signal.

For the first aspect of the invention introduced above, as noted already, the computing system as most broadly conceived is not a part of the invention but rather is an element of the context or environment of that invention. For a variant form of the first aspect of the invention, however, the protected computing system is a part of an inventive combination that includes the first aspect of the invention as broadly defined.

This dual character is common to all the other aspects discussed below, and also to the various preferences stated for those other aspects: in each case a variant form of the invention includes the guarded computing system. In addition, as also mentioned above, a particularly valuable set of preferences for the first aspect of the invention consists of combinations of that aspect with all the other aspects.

These combinations include crosscombinations of the first aspect with each of the others in turn—but also include combinations of three aspects, four and so on. Thus the most highly preferred form of the invention accordingly uses all of its inventive aspects.

In preferred embodiments of its second major independent facet or aspect, the invention is apparatus for deterring failure of a computing system. The apparatus includes a network of components having terminals for connection to the system, and circuits of the network for operating programs to guard the system from failure.

The circuits in preferred embodiments of the second facet of the invention also include portions for identifying failure of any of the circuits and correcting for the identified failure. (The "circuits" whose failure is identified and corrected for—in this second aspect of the invention—are the circuits of the network apparatus itself, not of the computing system.)

For the purposes of this document, the phrase "circuits . . . for operating programs" means either fabrication-pre-programmed hardware circuit, as described above, or a firmware- or even software-driven circuit, or hybrids of these types. As noted earlier, all-hardware circuitry is strongly preferred for practice of the invention; however, the main aspects other than the first one do not expressly require such construction.

The foregoing may represent a description or definition of the second aspect or facet of the invention in its broadest or most general form. Even as couched in these broad terms, however, it can be seen that this facet of the invention importantly advances the art.

In particular, as in the case of the first aspect of the invention, the benefits of this second aspect reside in the relative extremely high reliability of the protective apparatus. Whereas the first aspect focuses upon benefits derived from the structural character—as such—of that apparatus, this second aspect concentrates on benefits that flow from self-monitoring and correction on the part of that apparatus.

Although the second major aspect of the invention thus significantly advances the art, nevertheless to optimize enjoyment of its benefits preferably the invention is practiced in conjunction with certain additional features or characteristics. In particular, preferably the program-operating portions include a section that corrects for the identified failure by taking a failed circuit out of operation.

In event this basic preference is followed, a subpreference is that the program-operating portions include a section that substitutes and powers up a spare circuit for a circuit taken out of operation. Another basic preference is that the program-operating portions include at least three of the circuits; and that failure be identified at least in part by majority vote among the at least three circuits.

The earlier-noted dual character of the invention—as having a variant that includes the computing system—applies to this second aspect of the invention as well as the first, and also to all the other aspects of the invention discussed below. Also applicable to this second facet and all the others is the preferability of employing all the facets together in combination with each other.

In preferred embodiments of its third major independent facet or aspect, the invention is apparatus for deterring failure of a computing system that has at least one software subsystem for conferring resistance to failure of the system; the apparatus includes a network of components having terminals for connection to the system; and circuits of the network for operating programs to guard the system from failure.

The circuits include substantially no portion that interferes with the failure-resistance software subsystem. The foregoing may represent a description or definition of the third aspect or facet of the invention in its broadest or most general form. Even as couched in these broad terms, however, it can be seen that this facet of the invention importantly advances the art.

In particular, operation of this aspect of the invention advantageously refrains from tampering with protective features built into the guarded system itself. The invention thus takes forward steps toward ever-higher reliability without inflicting on the protected system any backward steps that actually reduce reliability.

Although the third major aspect of the invention thus significantly advances the art, nevertheless to optimize enjoyment of its benefits preferably the invention is practiced in conjunction with certain additional features or characteristics. In particular, as before, a preferred variant of the invention includes the protected computing system—here particularly including the at least one software subsystem.

In preferred embodiments of its fourth major independent facet or aspect, the invention is apparatus for deterring failure of a computing system that is substantially exclusively made of substantially commercial, off-the-shelf components and that has at least one hardware subsystem for generating a response of the system to failure. The apparatus includes a network of components having terminals for connection to the system; and circuits of the network for operating programs to guard the system from failure.

The circuits include portions for reacting to the response of the hardware subsystem. (In the "Detailed Description" section that follows, these portions may be identified as the so-called "M-nodes" and some instances of "D-nodes".)

The foregoing may represent a description or definition of the fourth aspect or facet of the invention in its broadest or most general form. Even as couched in these broad terms, however, it can be seen that this facet of the invention importantly advances the art.

In particular, this facet of the invention exploits the hardware provisions of the protected computing system—i.e. the most reliable portions of that system—to establish when the protected system is actually in need of active aid. In earlier systems the only effort to intercede in response to such need was provided from the computing system itself; and that system, in event of need, was already compromised.

Although the fourth major aspect of the invention thus significantly advances the art, nevertheless to optimize enjoyment of its benefits preferably the invention is practiced in conjunction with certain additional features or characteristics. In particular, preferably the reacting portions include sections for evaluating the hardware-subsystem response to establish characteristics of at least one recovery signal. When this basic preference is observed, a subpreference is that the reacting portions include sections for applying the at least one recovery signal to the system.

In preferred embodiments of its fifth major independent facet or aspect, the invention is apparatus for deterring failure of a computing system that is distinct from the apparatus and that has plural generally parallel computing channels. The apparatus includes a network of components having terminals for connection to the system; and circuits of the network for operating programs to guard the system from failure.

The circuits include portions for comparing computational results from the parallel channels. (In the "Detailed Description" section that follows, these portions may be identified as the so-called "D-nodes".)

The foregoing may represent a description or definition of the fifth aspect or facet of the invention in its broadest or most general form. Even as couched in these broad terms, however, it can be seen that this facet of the invention importantly advances the art.

In particular, this facet of the invention takes favorable advantage of redundant processing within the protected computing system, actually applying a reliable, objective external comparison of outputs from the two or more internal channels. The result is a far higher degree of confidence in the overall output.

Although the fifth major aspect of the invention thus significantly advances the art, nevertheless to optimize enjoyment of its benefits preferably the invention is practiced in conjunction with certain additional features or characteristics. In particular, preferably the parallel channels of the computing system are of diverse design or origin; when outputs from parallel processing within architecturally and even commercially diverse subsystems are objectively in agreement, the outputs are very reliable indeed.

Another basic preference is that the comparing portions include at least one section for analyzing discrepancies between the results from the parallel channels. If this preference is in effect, then another subsidiary preference is that the comparing portions further include at least one section for imposing corrective action on the system in view of the analyzed discrepancies. In this case a still further nested preference is that the at least one discrepancy-analyzing section uses a majority voting criterion for resolving discrepancies.

When the parallel channels of the computing system are of diverse design or origin—a preferred condition, as noted above—it is further preferable that the comparing portions include circuitry for performing an algorithm to validate a match that is inexact. This is preferable because certain types of calculations performed by diverse plural systems are likely to produce slightly divergent results, even when the calculations in the plural channels are performed correctly.

In the case of such inexactness-permissive matching, a number of alternative preferences come into play for accommodating the type of calculation actually involved. One is that the algorithm-performing circuitry preferably employs a degree of inexactness suited to a type of computation under comparison; an alternative is that the algorithm-performing circuitry performs an algorithm which selects a degree of inexactness based on type of computation under comparison.

In preferred embodiments of its sixth major independent facet or aspect, the invention is apparatus for deterring failure of a computing system that has plural processors; the apparatus includes a network of components having terminals for connection to the system; and circuits of the network for operating programs to guard the system from failure.

The circuits include portions for identifying failure of any of the processors and correcting for identified failure. (In the "Detailed Description" section that follows, these portions may be identified as the so-called "M-nodes" and some instances of "D-nodes".)

The foregoing may represent a description or definition of the sixth aspect or facet of the invention in its broadest or most general form. Even as couched in these broad terms, however, it can be seen that this facet of the invention importantly advances the art.

In particular, whereas the fifth aspect of the invention advantageously addresses the functional results of parallel processing in the protected system, this sixth facet of the invention focuses upon the hardware integrity of the parallel processors. This focus is in terms of each processor individually, as distinguished from the several processors considered in the aggregate, and thus beneficially goes to a level of verification not heretofore found in the art.

Although the sixth major aspect of the invention thus significantly advances the art, nevertheless to optimize enjoyment of its benefits preferably the invention is practiced in conjunction with certain additional features or characteristics. In particular, preferably the identifying portions include a section that corrects for the identified failure by taking a failed processor out of operation.

When this basic preference is actualized, then a subpreference is applicable: preferably the section includes parts for taking a processor out of operation only in case of signals indicating that the processor has failed permanently. Another basic preference is that the identifying portions include a section that substitutes and powers up a spare circuit for a processor taken out of operation.

In preferred embodiments of its seventh major independent facet or aspect, the invention is apparatus for deterring failure of a computing system. The apparatus includes a network of components having terminals for connection to the system; and circuits of the network for operating programs to guard the system from failure.

The circuits include modules for collecting and responding to data received from at least one of the terminals. The modules include at least three data-collecting and -responding modules, and also processing sections for conferring among the modules to determine whether any of the modules has failed.

The foregoing may represent a description or definition of the seventh aspect or facet of the invention in its broadest or most general form. Even as couched in these broad terms, however, it can be seen that this facet of the invention importantly advances the art.

In particular, whereas the earlier-discussed fifth aspect of the invention enhances reliability through comparison of processing results among subsystems within the protected computing system, this seventh facet of the invention looks to comparison of modules in the protective apparatus itself—to attain an analogous upward step in reliability of the hybrid overall system.

Although the seventh major aspect of the invention thus significantly advances the art, nevertheless to optimize enjoyment of its benefits preferably the invention is practiced in conjunction with certain additional features or characteristics. In particular, these preferences as mentioned earlier include crosscombinations of the several facets or aspects, and also the dual character of the invention—i. e., encompassing a variant overall combination which includes the protected computing system.

In preferred embodiments of its eighth major independent facet or aspect, the invention is apparatus for deterring failure of a computing system. The latter system is substantially exclusively made of substantially commercial, off-the-shelf components, and has at least one subsystem for generating a response of the system to failure—and also has at least one subsystem for receiving recovery commands.

The apparatus includes a network of components having terminals for connection to the system between the response-generating subsystem and the recovery-command-receiving subsystem. It also has circuits of the network for operating programs to guard the system from failure.

The circuits include portions for interposing analysis and a corrective reaction between the response-generating subsystem and the command-receiving subsystem. The foregoing may represent a description or definition of the eighth aspect or facet of the invention in its broadest or most general form. Even as couched in these broad terms, however, it can be seen that this facet of the invention importantly advances the art.

In particular, earlier fault-deterring efforts have concentrated upon feeding back corrective reaction within the protected system itself. Such prior attempts are flawed in that generally commercial, off-the-shelf systems intrinsically lack both the reliability and the analytical capability to police their own failure modes.

Although the eighth major aspect of the invention thus significantly advances the art, nevertheless to optimize enjoyment of its benefits preferably the invention is practiced in conjunction with certain additional features or characteristics. In particular, preferably the general preferences mentioned above (e. g. as to the seventh facet) are equally applicable here.

All of the foregoing operational principles and advantages of the present invention will be more fully appreciated upon consideration of the following detailed description, with reference to the appended drawings, of which:

BRIEF DESCRIPTION OF THE DRAWINGS

FIG. 8 is a set of three flow diagrams—FIG. 8*a* showing a power-on sequence for the M-cluster, controlled by S3-nodes, FIG. 8 *b* showing a power-on sequence for the outer ring (one node), controlled by an M-cluster, and FIG. 8*c* showing a power-off sequence for the invention;

Figure 1:
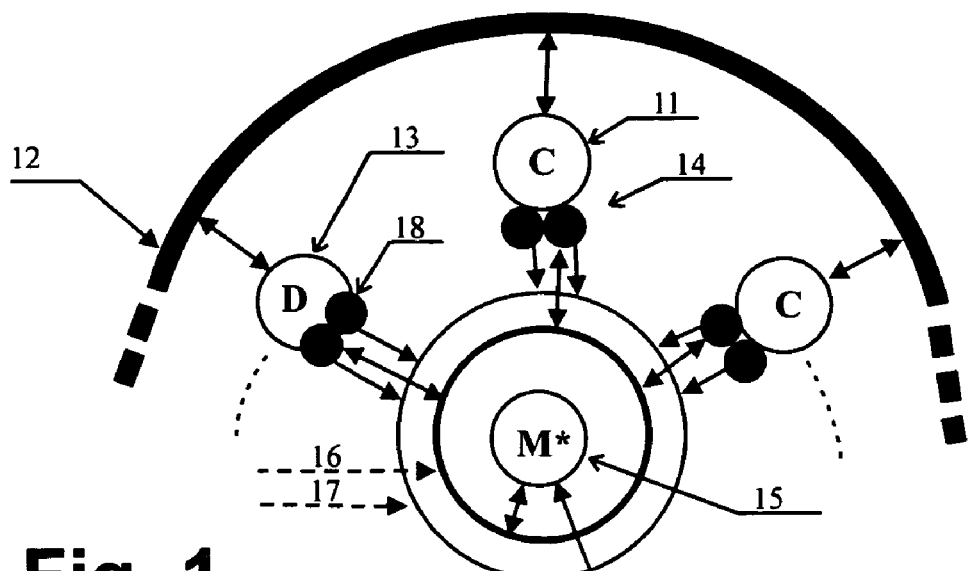
FIG. 1 is a partial block diagram, very schematic, of a two-ring architecture used for preferred embodiments of the invention.

A key to symbols and callouts used in the drawings appears at the end of this text, preceding the claims.

DETAILED DESCRIPTION OF THE PREFERRED EMBODIMENTS

1. System Elements

Preferred embodiments of the present invention provide a so-called "fault-tolerance infrastructure" (FTI) that is a system composed of four types of special-purpose controllers which will be called "nodes". The nodes are ASICs (application-specific integrated circuits) that are controlled by hardwired sequencers or by microcode.

The preferred embodiments employ no software. The four kinds of nodes will be called:
(1) A-nodes (adapter nodes);
(2) M-nodes (monitor nodes);
(3) D-nodes (decision nodes); and
(4) S3-nodes (startup, shutdown, and survival nodes).

The purpose of the FTI is to provide protection against all five causes of system failure for a computing system that can be substantially conventional and composed of COTS components, called C-nodes (computing nodes). Merely for the sake of simplicity—and tutorial clarity in emphasizing the capabilities of the invention—this document generally refers to the C-nodes as made up of COTS components, or as a "COTS system"; however, it is to be understood that the invention is not limited to protection of COTS systems and is equally applicable to guarding custom systems.

The C-nodes are connected to the A-nodes and D-nodes of the FTI in the manner described subsequently. The C-nodes can be COTS microprocessors, memories, and components of the supporting chipset in the COTS computer system that will be called the "client system" or simply the "client".

The following protection for the client system is provided when it is connected to the FTI.
(1) The FTI provides error detection and recovery support when the client COTS system is affected by physical failures of its components (F1) and by external interference (F2). The FTI provides power switching for unpowered spare COTS components of the client system to replace failed COTS components (F1) in long-duration missions.
(2) The FTI provides a "shutdown-hold-restart" recovery sequence for catastrophic events (F2, F3, F4) that affect either the client COTS system or both the COTS and FTI systems. Such events are: a "crash" of the client COTS system software, an intensive burst of radiation, temporary outage of client COTS system power, etc.
(3) The FTI provides (by means of the D-nodes) the essential mechanisms to detect and to recover from the manifestations of software and hardware design faults (F3) in the client system.
This is accomplished by the implementation of design diversity [3, 4]. Design diversity is the implementation of redundant channel computation (duplication with comparison, triplication with voting, etc.) in which each channel (i. e. C-node) employs independently designed hardware and software, while the D-node serves as the comparator or voter element. Design diversity also provides detection and neutralization of malicious software (F4) and of mistakes (F5) by operators or maintenance personnel [5].

Finally, the nodes and interconnections of the FTI are designed to provide protection for the FTI system itself as follows.
(1) Error detection and recovery algorithms are incorporated to protect against causes (F1) and (F2).
(2) The absence of software in the FTI provides immunity against causes (F4) and (F5).
(3) The overall FTI design allows the introduction of diverse hardware designs for the A-, M-, S3-, and D-nodes in order to provide protection against cause (F3), i. e. hardware design faults. Such protection may prove not be necessary, since low complexity of the node structure should allow complete verification of the node designs.

When interconnected in the manner described below, the FTI and the client COTS computing system form a high-performance computing system that is protected against all five system failure causes (F1)-(F5). For purposes of the present document this system will be called a "diversifiable self-testing and -repairing system" ("DiSTARS").

2. Architecture of DiSTARS (a) The DiSTARS Configuration—The structure of a preferred embodiment of DiSTARS conceptually consists of two concentric rings (FIG. 1): an Outer Ring and an Inner Ring. The Outer Ring contains the client COTS system, composed of Computing Nodes or C-nodes 11 (FIG. 1) and their System Bus 12.

The C-nodes are either high-performance COTS processors (e. g. Pentium II) with associated memory, or other COTS elements from the supporting chipset (I/O controllers, etc.), and other subsystems of a server platform [8]. The Outer Ring is supplemented with custom-designed Decision Nodes or "D-nodes" 13 that communicate with the C-nodes via the System Bus 12. The D-nodes serve as comparators or voters for inputs provided by the C-nodes. They also provide the means for the C-nodes to communicate with the Inner Ring. Detailed discussion of the D-node is presented later.

The Inner Ring is a custom-designed system composed of Adapter Nodes or "A-nodes" 14 and a cluster of Monitor Nodes, or "M-nodes", called the M-cluster 15. The A-nodes and the M-nodes communicate via the Monitor Bus or "M-bus" 16. Every A-node also has a dedicated A-line 17 for one-way communication to the M-nodes. The custom-designed D-nodes 13 of the Outer Ring contain embedded A-ports 18 that serve the same purpose as the external A-nodes of the C-node processors.

The M-cluster serves as a fault-tolerant controller of recovery management for the C- and D-nodes in the Outer Ring. The M-cluster employs hybrid redundancy (triplication and voting, with unpowered spares) to assure its own continuous availability. It is an evolved descendant of the Test-and-Repair processor of the JPL-STAR computer [9]. Two dedicated A-nodes are connected to every C-node, and every D-node contains two A-ports. The A-nodes and A-ports serve as the input and output devices of the M-cluster: they relay error signals and other relevant outputs of the C- and D-nodes to the M-cluster and return M-cluster responses to the appropriate C- or D-node inputs.

The custom-designed Inner Ring and the D-nodes provide an FTI that assures dependable operation of the client COTS computing system composed of the C-nodes. The infrastructure is generic; that is, it can accommodate any client system (set of Outer Ring C-node chips) by providing them with the A-nodes and storing the proper responses to A-node error messages in the M-nodes. Fault-tolerance techniques are extensively used in the design of the infrastructure's components.

The following discussion explains the functions and structure of the inner ring elements (FIG. 2)—particularly the A- and M-nodes, the operation of the M-cluster, and the communication between the M-cluster and the A-nodes. Unless explicitly stated otherwise, the A-ports are structured and behave like the A-nodes. The D-nodes are discussed in Section 3 below.

(b) The Adapter Nodes (A-Nodes) and A-lines—The purpose of an A-node (FIG. 4a) is to connect a particular C-node to the M-cluster that provides Outer Ring recovery management for the client COTS system. The functions of an A-node are to:
1. transmit error messages that are originated by its C-node to the M-cluster;

2. transmit recovery commands from the M-cluster to its C-node;
3. control the power switch of the C-node and its own fuse according to commands received from the M-cluster; and
4. report its own status to the M-cluster.

Figure 3:
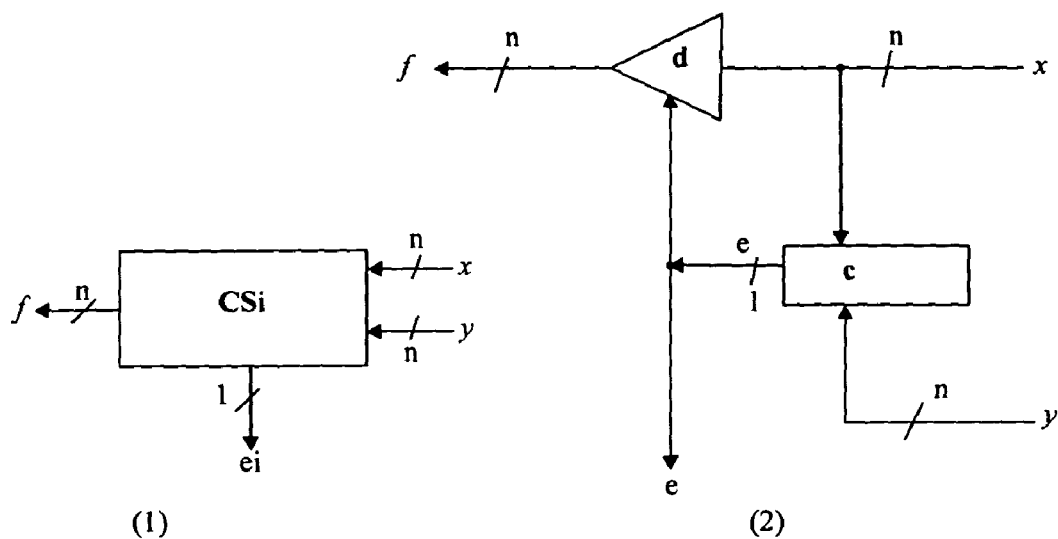
FIG. 3 is an electrical schematic of an n-bit comparator and switch used in preferred embodiments.

Every C-node is connected to an A-pair that is composed of two A-nodes, three CS units CS1, CS2, CS3 (FIG. 4b), one OR Power Switch 415 that provides power to the C-node and one Power Fuse 416 common to both A-nodes and the CS units. The internal structure of a CS unit is shown in FIG. 3. The two A-nodes (FIG. 4a) of the A-pair have, in common, a unique identification or "ID" code 403 that is associated with their C-node; otherwise, all A-nodes are identical in their design. They encode the error signal outputs 431 of their C-node and decode the recovery commands 407 to serve as inputs 441a to the comparator CS1 that provides command inputs to the C-node.

As an example, consider the Pentium II processor as a C-node. It has five error signal output pins: AERR (address parity error), BINIT (bus protocol violation), BERR (bus non-protocol error), IERR (internal non-bus error), and THERMTRIP (thermal overrun error) which leads to processor shutdown. It is the function of the A-pair to communicate these signals to the M-cluster. The Pentium II also has six recovery command input pins: RESET, INIT (initialize), BINIT (bus initialize), FLUSH (cache flush), SMI (system management interrupt), and NMI (non-maskable interrupt). The A-pair can activate these inputs according to the commands received from the M-cluster.

Each A-node has a separate A-line 444a, 444b for messages to the M-cluster. The messages are:
(1) All is well, C-node powered,
(2) All is well, C-node unpowered,
(3) M-bus request,
(4) Transmitting on M-bus, and
(5) Internal A-node fault.

All A-pairs of the Inner Ring are connected to the M-bus, which provides two-way communication with the M-cluster as discussed in the next subsection.

Figure 4A:
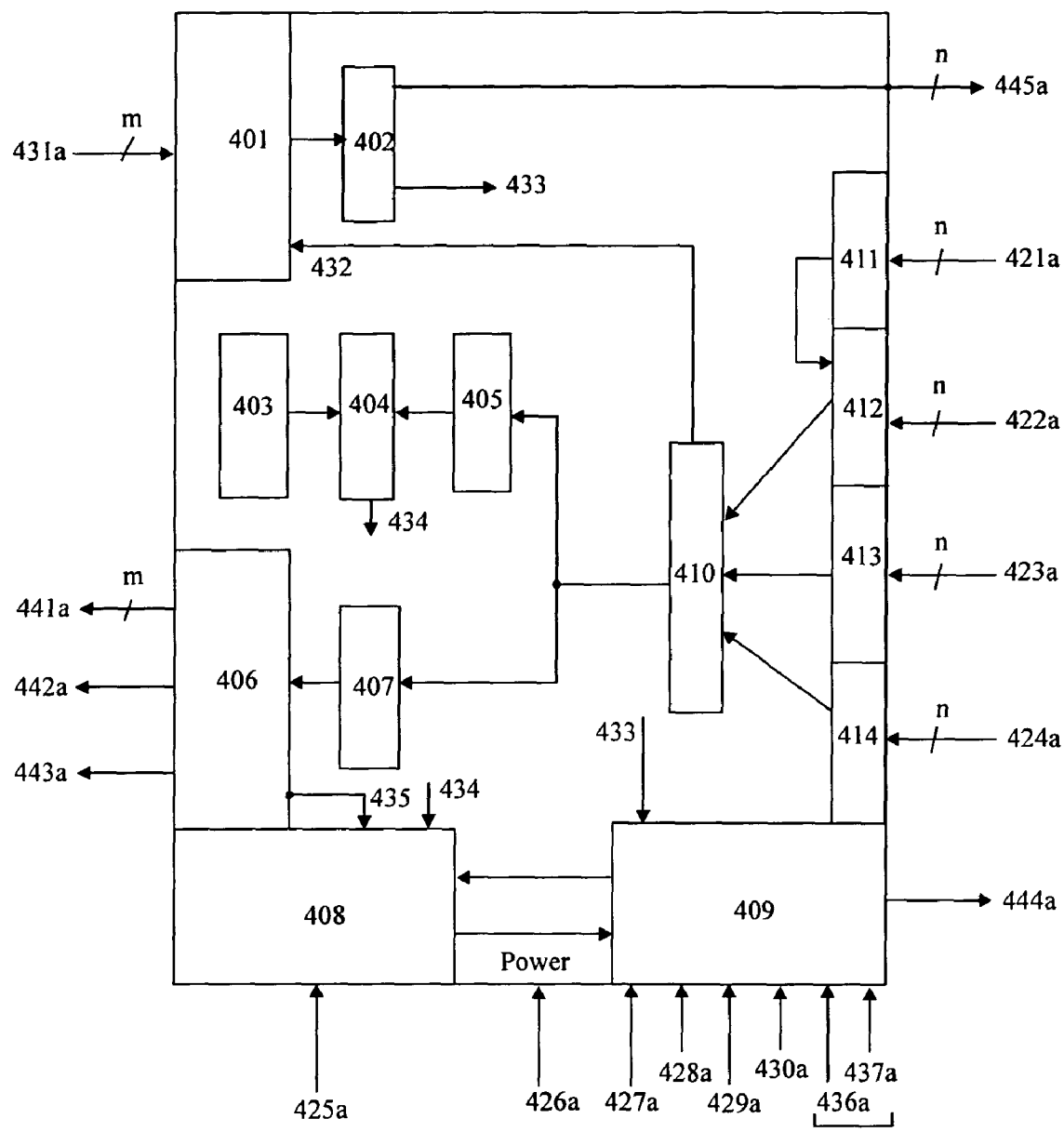
FIG. 4 is a set of two like schematics—FIG. 4*a* showing one "A-node" or "A-port" (namely the "a" half of a self-checking A-pair "a" and "b"), and FIG. 4*b* showing connections of A-nodes "a" and "b" with their C-node.

The outputs 441a, 441b (FIG. 4b) of the A-pair to the C-node, outputs 442a, 442b to the C-node power switch and outputs 445a, 445b to the M-bus are compared in Comparator circuits CS1, CS2, CS3. In case of disagreement, the outputs 441, 442, 445 are inhibited (assume the high-impedance third state Z) and an "Internal fault" message is sent on the two A-lines 444a, 444b (FIG. 4a). The single exception is the C-node Power-Off command. One Power-Off command is sufficient to turn C-node power 446 (FIG. 4b) off after the failure of one A-node in the pair.

The A-pair remains powered by Inner Ring power 426 when Outer Ring power 446 to its C-node is off—i. e., when the C-node is a spare or has failed. The failure of one A-node in the self-checking A-pair turns off the power of its C-node. A fuse 416 is used to remove power from a failed A-pair, thus protecting the M-bus against "babbling" outputs from the failed A-pair. Clock synchronization signals 425a (FIG. 4a) are delivered from the M-cluster. The low complexity of the A-node allows the packaging of the A-pair and power switch as one IC device.

(c) The Monitor (M-) Nodes, M-Cluster and M-Bus—The purpose of the Monitor Node (M-node, FIG. 5) is to collect status and error messages from one or more (and in the aggregate all) A-nodes, to select the appropriate recovery action, and to issue recovery-implementing commands to the A-node or nodes via the Monitor Bus (M-Bus). To assure continuous availability, the M-nodes are arranged in a hybrid redundant M-cluster—with three powered M-nodes in a triplication-and-voting mode, or as it is often called "triple modular redundancy" (TMR); and also with unpowered spare M-nodes. The voting on output commands takes place in Voter logic 410 (FIG. 4a) located in the A-nodes. A built-in self-test (BIST) sequence 408 is provided in every M-node.

The M-bus is controlled by the M-cluster and connected to all A-nodes, as discussed in the previous section. All messages are error-coded, and spare bus lines are provided to make the M-bus fault-tolerant. Two kinds of messages are sent to the A-pairs by the M-cluster: (1) an acknowledgment of A-pair request (on their A-lines 444a, 444b) that allocates a time slot on the M-bus for the A-pair error message; and (2) a command in response to the error message.

An M-node stores two kinds of information: static (permanent) and dynamic. The static (ROM) data 505 (FIG. 5) consist of:
(1) predetermined recovery command responses to A-pair error messages,
(2) sequences for M-node recovery and replacement in the hybrid-redundant M-cluster, and
(3) recovery sequences for catastrophic events—discussed in subsection 2(f).

The dynamic data consist of:
(1) Outer Ring configuration status 504 (active, spare, failed node list),
(2) Inner Ring configuration status 503 and system time 502,
(3) a "scratchpad" store 501, 506, 507, 509, 510 for current activity: error messages still active, requests waiting, etc., and
(4) an Inner Ring activity log (also in 506).

The configuration status and system time are the critical data that are also stored in nonvolatile storage in the S3 nodes of the Cluster Core—discussed in subsection 2(d).

As long as all A-nodes continue sending "All is well" messages on their A-lines (525 through 528 and so on), the M-cluster issues 541 "All is well" acknowledgments. When an "M-bus request" message arrives on two A-lines that come from a single A-pair that has a unique C-node ID code, the M-cluster sends 541 (on the M-bus) the C-node ID followed by the "Transmit" command. In response, the A-pair sends 522 (on the M-bus) its C-node ID followed by an Error code originated by the C-node. The M-nodes return 541 the C-node ID followed by a Recovery command for the C-node. The A-pair transmits the command to the C-node and returns 522 an acknowledgment: its C-node ID followed by the command it forwarded to the C-node. At the times when an A-pair sends a message on the M-bus, its A-lines send the "Transmitting" status report. This feature allows the M-cluster to detect cases in which a wrong A-pair responds on the M-bus. The A-pair also sends an Error message on that bus if its voters detect disagreements between the three M-cluster messages received on the M-bus.

When the A-pair comparators CS1, CS2, CS3 (FIG. 3b) detect a disagreement, the A-lines send an "Internal Fault" message to the M-cluster, which responds (on the M-bus) with the C-node ID followed by the "Reset A-pair" command. Both of the A-nodes of the A-pair attempt to reset to an initial state, but do not change the setting of the C-node power switch. Success causes "All is well" to be sent on the A-lines to the M-cluster. In case of failure to reset, the A-lines continue sending the "Internal Fault" message.

The M-cluster sends "Power On" and "Power Off" commands 522 (FIG. 5) as part of a replacement or reconfiguration sequence for the C-nodes. They are acknowledged immediately but power switching itself takes a relatively long time. When switching is completed, the A-pair issues an "M-bus Request" on its A-lines and then reports 522 on the M-bus the success (or failure) of the switching to the M-cluster via the M-bus.

When the M-cluster determines that one A-node of an A-pair has permanently failed, it sends an "A-pair Power Off" message 541 to that A-pair. The good A-node receives the message, turns C-node power 446 (FIG. 4b) off—if it was on—and then permanently opens (by 443a or 443b) the A-pair power fuse 416. The M-cluster receives confirmation via the A-lines 444a, 444b, (FIG. 4a) which assume the "no power" state. This irreversible command is also used when a C-node fails permanently and must be removed from the Outer Ring.

(d) The M-Cluster Core—The Core (FIG. 6) of the earlier-introduced M-cluster (FIG. 2) includes a set of S3-nodes (FIG. 7) and communication links. As mentioned earlier, "S3" stands for Startup, Shutdown, Survival). The M-nodes (FIG. 5) have dedicated "Disagree" 545, "Internal Error" 544 and "Replacement Request" 543 outputs to all other M-nodes and to the S3-nodes. The IntraCluster-Bus or IC-Bus 602 (FIG. 6) interconnects all M-nodes.

Figure 7:
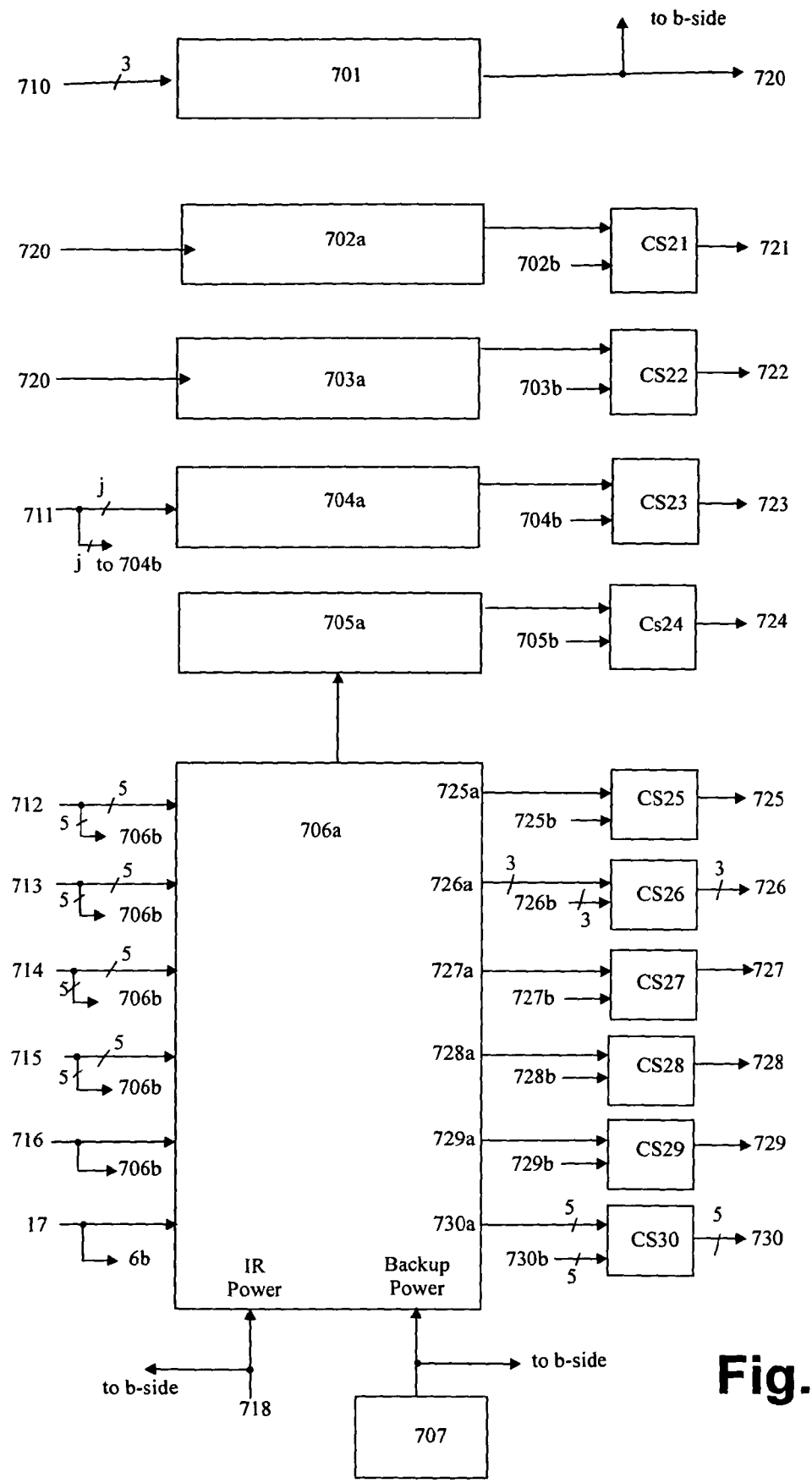
FIG. 7 is a schematic like FIGS. 3 through 5 but showing one self-checking S3-node (b-side blocks not shown) in a total set of four S3-nodes.

The purpose of the S3 nodes is to support the survival of DiSTARS during catastrophic events, such as intensive bursts of radiation or temporary loss of power. Every S3-node is a self-checking pair with its own backup (battery) power 707 (FIG. 7). At least two S3 nodes are needed to attain fault-tolerance, and the actual number needed depends on the mission length without external repair.

The functions of the S3 nodes are to:
(1) execute the "power-on" and "power-off" sequences (FIG. 8) for DiSTARS;
(2) provide fault-tolerant clock signals 720 (FIG. 7);
(3) keep System Time 702a and System Configuration 704a, 705a data in nonvolatile, radiation-hardened registers; and
(4) control M-node power switches 511 (FIG. 5), and I-Ring power 450 (FIG. 4b) to the A-pairs, in order to support M-cluster recovery.

More details of S3-node operation follow in subsection 2(f).

Each self-checking S3 node has its own clock generator 701 (FIG. 7). The hardware-based fault-tolerant clocking system developed at the C. S. Draper Laboratory [10] is the most suitable for the M-cluster.

(e) Error Detection and Recovery in the M-cluster—At the outset, the three powered M-nodes 201a, 201b, 201c (FIG. 2) are in agreement and contain the same dynamic data. They operate in the triple modular redundancy (TMR) mode. Three commands are issued in sequence on the M-bus 202 and voted upon in the A-nodes 410 (FIG. 4a). During operation of the M-cluster, one M-node may issue an output different from the other two, or one M-node may detect an error internally and send an "Internal Error" signal on a dedicated line 544 (FIG. 5) to the other M-nodes. The cause may be either a "soft" error due to a transient fault, or a "hard" error due to physical failure.

Figure 5:
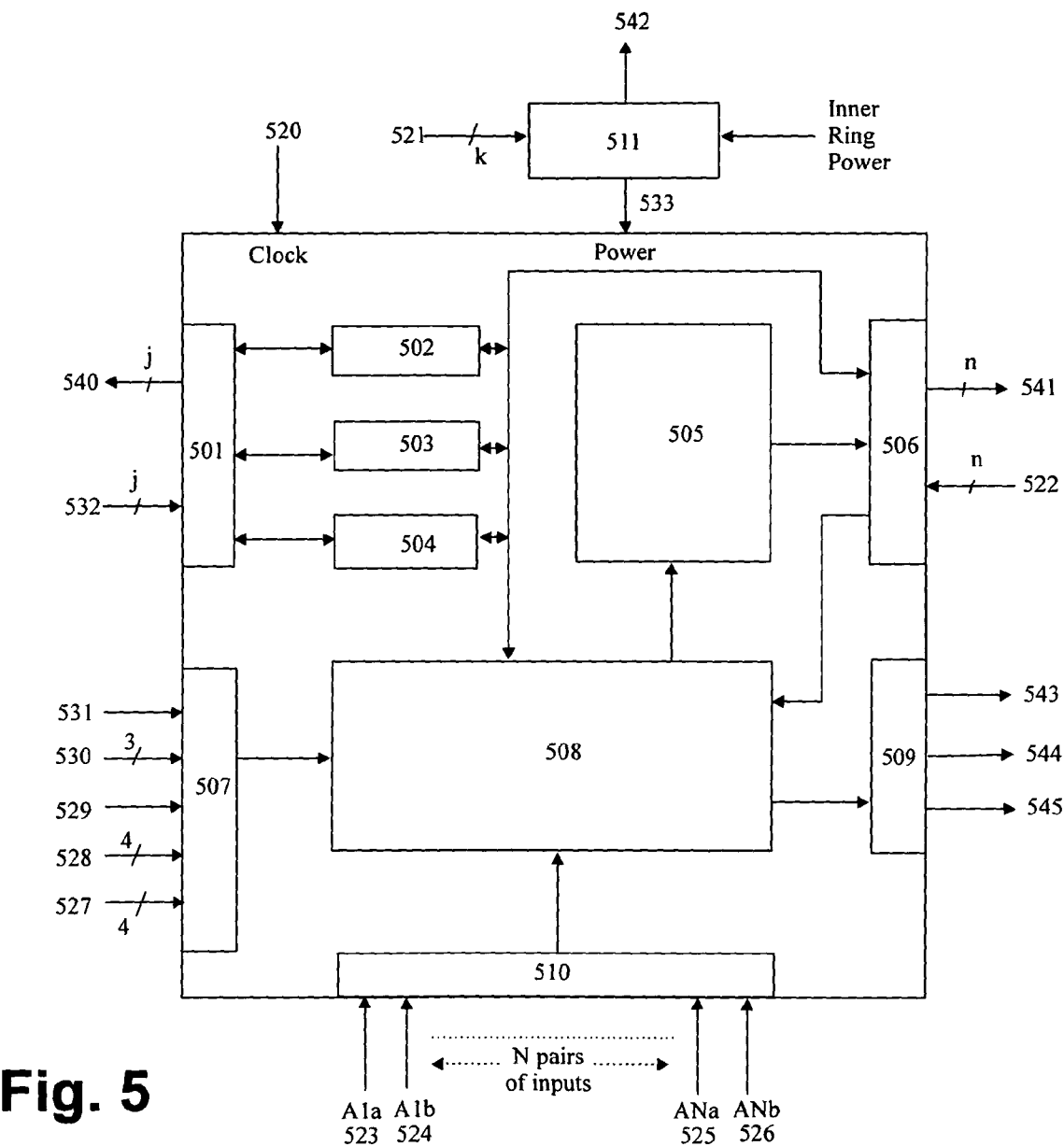
FIG. 5 is a like schematic showing one M-node (monitor node) from a five-node M-cluster.

M-node output disagreement detection in the TMR mode (when one M-node is affected by a fault) works as follows. The three M-nodes 201a, 201b, 201c (FIG. 2) place their out-puts on the M-bus 202 in a fixed sequence. Each M-node compares its output to the outputs of the other two nodes, records one or two disagreements, and sends one or two "Disagree" messages to the other M-nodes on a dedicated line 545 (FIG. 5). The affected M-node will disagree twice, while the good M-nodes will disagree once each and at the same time, which is the time slot of the affected M-node.

Following error detection, the following recovery sequence is carried out by the two good M-nodes.

(1) Identify the affected M-node or the M-node that sent the Internal Error message, and enter the Duplex Mode of the M-cluster.
(2) Attempt "soft" error recovery by reloading the dynamic data of the affected M-node from the other two M-nodes and resume TMR operation.
(3) If Step (2) does not lead to agreement, send request for replacement 543 (FIG. 5) of the affected M-node to the S3-nodes.
(4) The S3-nodes replace the affected M-node and send "Resume TMR" command 726 (FIG. 7)
(5) Load the new M-node with dynamic data from the other two M-nodes and resume TMR operation.

During the recovery sequence, the two good (agreeing) M-nodes 601a, 601b (FIG. 6) operate in the Duplex Mode, in which they continue to communicate with the A-nodes and concurrently execute the recovery steps (2) through (5). The Duplex Mode becomes the permanent mode of operation if only two good M-nodes are left in the M-cluster. Details of the foregoing M-cluster recovery sequence are discussed next.

Step (1): Entering Duplex Mode. The simultaneous disagreement 527 (FIG. 5) by the good M-nodes 601a, 601b (FIG. 6) during error detection causes the affected M-node c1 to enter the "Hold" mode, in which it inhibits its output 541 (FIG. 5) to the M-bus and does not respond to inputs on the A-lines. It also clears its "Disagree" output 645. If the affected node 601c (FIG. 6) does not enter the "Hold" mode, step (3) is executed to cause its replacement. An M-node similarly enters the "Hold" mode when it issues an Internal Error message 544 (FIG. 5) to the other two M-nodes, which enter the Duplex Mode at that time. It may occur that all three M-nodes disagree, i. e., each one issues two "Disagree" signals 545, or that two or all three M-nodes signal Internal Error 544. These catastrophic events are discussed in subsection 2(f).

The two good M-nodes 601a, 601b (FIG. 6) still send three commands to the A-nodes in Duplex Mode during steps (2)-(5). During t1 and t2 they send their outputs to the M-bus and compare. An agreement causes the same command to be sent during t3; disagreement invokes a retry, then catastrophic event recovery. The good M-nodes continue operating in Duplex Mode if a spare M-node is not available after the affected node has been powered off in step (3). TMR operation is permanently degraded to Duplex in the M-cluster.

Step (2): Reload Dynamic Data of the Affected M-node (assuming M-node 601c [FIG. 6] is affected). An IntraCluster Bus or IC-bus 2 is used for this purpose. At times t1 and t2 the good M-nodes 601a, 601b place the corresponding dynamic data on the IC-Bus 602; at time t3 the affected node 601c compares and stores it. The good nodes also compare their outputs. Any disagreement causes a repetition of times t1, t2, t3. A further disagreement between good nodes is a catastrophic event. After reloading is completed, it is validated: the affected node reads out its data, and the good nodes compare it to their copies. A disagreement leads to step (3), i. e. power-off for the affected node; otherwise the M-cluster returns to TMR operation.

Steps (3) and (4): Power Switching. Power switching 511 (FIG. 5) is a mechanism for removing failed M-nodes and bringing in spares in the M-cluster. Failed nodes with power on can lethally interfere with M-cluster functioning; therefore very dependable switching is essential. The power-switching function 730 (FIG. 7) is performed by the S3-nodes in the Cluster Core. They maintain a record of M-cluster status in nonvolatile storage 705a. Power is turned off for the failed M-node, the next spare is powered up, BIST is executed, and the "Resume TMR" command 530 (FIG. 5) is sent to the M-nodes.

Step (5): Loading a New M-node. When the "Resume TMR" command of step (4) is received, the new M-node must receive the dynamic data from the two good M-nodes. The procedure is the same as step (2).

(f) Recovery after Catastrophic Events—Up to this point recovery has been defined in response to an error signal from one C-node, A-node, or M-node for which the M-cluster had a predetermined recovery command or sequence. These recoveries are classified as local and involve only one node.

It is possible, however, for error signals to originate from two or more nodes concurrently (or close in time). A few such cases have been identified as "catastrophic" events (c-events) in the preceding discussion. It is not practical to predetermine unique recovery for each c-event; therefore, more general catastrophe-recovery (c-recovery) procedures must be devised.

In general, I can distinguish c-events that affect the Outer Ring only, and c-events that affect the Inner Ring as well. For the Outer Ring a c-event is a crash of system software that requires a restart with Inner Ring assistance. The Inner Ring does not employ software, thus assuming well proven ASIC programming its crash cannot occur in the absence of hardware failure (F1), (F2).

There are, however, adverse physical events of the (F1) and (F2) types that can cause c-events for the entire DiSTARS. Examples are: (1) external interference by radiation; (2) fluctuations of ambient temperature; (3) temporary instability or outage of power; (4) physical damage to system hardware.

The predictable manifestations of these events in DiSTARS are: (1) halt in operation due to power loss; (2) permanent failures of system components (nodes) and/or communication links; (3) crashes of Outer Ring application and system software; (4) errors in or loss of M-node data stored in volatile storage; (5) numerous error messages from the A-nodes that exceed the ability of M-cluster to respond in time; (6) double or triple disagreements or Internal Error signals in the M-cluster TMR or Duplex Modes.

The DiSTARS embodiments now most highly preferred employ a System Reset procedure in which the S3-nodes execute a "power-off" sequence (FIG. 8*c*) for DiSTARS on receiving a c-event signal either from sensors (radiation level, power stability, etc.) or from the M-nodes. System Time 702*a* (FIG. 7) and DiSTARS configuration data 704*a*, 705*a* are preserved in the radiation-hardened, battery-powered S3-nodes. The "power-on" sequence (FIGS. 8*a*, 8*b*) is executed when the sensors indicate a return to normal conditions.

Outer Ring power is turned off when the S3-node sends the signal 729 (FIG. 7) to remove power from the A-pairs, thus setting all C-node switches to the "Off" position. M-node power is directly controlled by the S3-node output 730.

The "power-on" sequence for M-nodes (FIG. 8*a*) begins with the S3-nodes applying power and executing BIST to find three or two good M-nodes, loading them via the IC-Bus with critical data, then applying I-Ring power to the A-pairs. The sequence continues with sending the "Outer Ring Power On" command 727 (FIG. 7) to the M-cluster.

To start the "power on" sequence for C- and D-nodes (FIG. 8*b*) the M-cluster commands (on the M-bus) "Power-On" followed by BIST sequentially for the C-nodes and D-nodes of the Outer Ring, and the system returns to an operating condition, possibly having lost some nodes due to the catastrophic event.

Currently preferred embodiments are equipped with only the "power-off" sequence to respond to c-events. The invention, however, contemplates introducing less drastic and faster recovery sequences for some less harmful c-events. Experiments in progress with the prototype DiSTARS system address development of such sequences.

3. The Decision (D-) Nodes and Diversification (a) The rationale for D-Nodes—The A-nodes in the discussion thus far have been the only means of communication between the Inner and Outer Rings, and they convey only very specific C-node information. A more-general communication link is needed. The Outer Ring may need configuration data and activity logs from the M-cluster, or to command the powering up or down of some C-nodes for power management reasons. An InterRing communication node beneficially acts as a link between the System Bus of the Outer Ring and the M-bus of the Inner Ring.

A second need of the Outer Ring is enhanced error detection coverage. For example, as described in subsection 2(b), the Pentium II has only five error-signal outputs of very general nature, and in a recent study [6, 7] their coverage was estimated to be very limited. The original design of the P6 family of Intel processors included the FRC (functional redundancy checking) mode of operation in which two processors could be operated in the Master/Checker mode, providing very good error confinement and high error detection coverage. Detection of an error was indicated by the FRCERR signal. Quite surprisingly and without explanation, the FRCERR pin was removed from the specification in April 1998, thus effectively canceling the use of the FRC mode long after the P6 processors reached the market.

In fairness it should be noted that other processor makers have never even tried to provide Master/Checker duplexing for their high-performance processors with low error detection coverage. An exception is the design of the IBM G5 and G6 processors [7].

This observation explains the inclusion of a custom Decision Node (D-node) on the Outer Ring System Bus that can serve as an external comparator or voter for the C-node COTS processors. It is even more important that the D-node also be able to support design diversity by providing the appropriate decision algorithms for N-version programming [4] employing diverse processors as the C-nodes of the Outer Ring.

The use of processor diversity has become important for dependable computing because contemporary high-performance processors contain significant numbers of design faults. For example, a recent study shows that in the Intel P6 family processors from forty-five to 101 design faults ("errata") were discovered (as of April 1999) after design was complete, and that from thirty to sixty of these design faults remain in the latest versions ("steppings") of these processors [2].

(b) Decision Node (D-Node) Structure and Functions—The D-nodes (FIG. 9) need to be compatible with the C-nodes on the System Bus and also embed Adapter (A-) Ports analogous to the A-nodes that are attached to C-nodes. The functions of the D-nodes are:

(1) to transmit messages originated by C-node software to the M-cluster;

(2) to transfer M-cluster data to the C-nodes that request it;

(3) to accept C-node outputs for comparison or voting and to return the results to the C-nodes;

(4) to provide a set of decision algorithms for N-version software executing on diverse processors (C-nodes), to accept cross-check point outputs and return the results;

(5) to log disagreement data on the decisions; and (6) to provide high coverage and fault tolerance for the execution of the above functions.

Ideally the programs of the C-nodes are written with provisions to take advantage of D-node services. The relatively simple functions of the D-node can be implemented by microcode and the D-node response can be very fast. Another advantage of using the D-node for decisions (as opposed to doing them in the C-nodes) is the high coverage and fault tolerance of the D-node (implemented as a self-checking pair) that assures error-free results.

The Adapter Ports (A-Ports) of the D-node need to provide the same services that the A-nodes provide to the C-nodes, including power switching for spare D-node utilization. In addition, the A-ports must also serve to relay appropriately formatted C-node messages to the M-cluster, then accept and vote on M-cluster responses. The messages are requests for C-node power switching, Inner and Outer Ring configuration information, and M-cluster activity logs. The D-node can periodically request and store the activity logs, thus reducing the amount of dynamic storage in the M-nodes. The D-nodes can also serve as the repositories of other data that may support M-cluster operations, such as the logs of disagreements during D-node decisions, etc.

The relatively simple D-nodes can effectively compensate for the low coverage and poor error containment of contemporary processors (e. g. Pentium II) by allowing their duplex or TMR operation with reliable comparisons or voting and with diverse processors executing N-version software for the tolerance of software and hardware design faults.

4. A Proof-of-Concept Experimental System

The Two Ring configuration, with the Inner Ring and the D-nodes providing the fault-tolerance infrastructure for the Outer Ring of C-nodes that is a high-performance "client" COTS computer, is well defined and complete.

Many design choices and tradeoffs, however, remain to be evaluated and chosen. A prototype DiSTARS system for experimental evaluation uses a four-processor symmetric multiprocessor configuration [11] of Pentium II processors with the supporting chipset as the Outer Ring. The Pentium II processors serve as C-nodes. The S3-nodes, M-nodes, D-nodes, A-nodes and A-ports are being implemented by Field-Programmable Gate Arrays (FPGAs).

This development includes construction of power switches and programming of typical applications running on duplex C-nodes that use the D-node for comparisons; and diversification of C-nodes and N-version execution of typical applications. Building and refining the Inner Ring that can support the Pentium II C-nodes of the Outer Ring provides a proof of the "fault-tolerance infrastructure" concept.

5. Extensions and Applications

The Inner Ring and D-nodes of DiSTARS offer what may be called a "plug-in" fault-tolerance infrastructure for the client system, that uses contemporary COTS high-performance, but low-coverage processors with their memories and supporting chipsets. The infrastructure is in effect an analog of the human immune system [12] in the context of contemporary hardware platforms [8]. DiSTARS is an illustration of the application of the design paradigm presented in [12].

A desirable advance in processor design is to incorporate an evolved variant of the infrastructure into the processor structure itself. This is becoming feasible as the clock rate and transistor count on chips race upward according to Moore's Law. The external infrastructure concept, however, remains viable and necessary to support chip-level sparing, power switching, and design diversity for hardware, software, and device technologies.

The high reliability and availability that may be attained by using the infrastructure concept in system design is likely to be affordable for most computer systems. There exist, however, challenging missions that can only be justified if their computers have high coverage with respect to transient and design faults as well as low device failure rates.

Two such missions that are still in the concept and preliminary design phases are the manned mission to Mars [13] and unmanned interstellar missions [14].

The Mars mission is about 1000 days long. The proper functioning of the spacecraft and therefore the lives of the astronauts depend on the continuous availability of computer support, analogous to primary flight control computers in commercial airliners. Device failures and wear-out are not major threats for a 1000 day mission, but design faults and transient faults due to cosmic rays and solar flares are to be expect and their effects need to be tolerated with very high coverage, i. e. probability of success. It will also be necessary to employ computers to monitor all spacecraft systems and perform automatic repair actions when needed [9, 15], as the crew is not likely to have the necessary expertise and access for manual repairs. Here again computer failure can have lethal consequences and very high reliability is needed.

Another challenging application for a DiSTARS type fault-tolerance computer is on-board operation in an unmanned spacecraft intended for an interstellar mission. Since such missions are essentially open-ended, lifetimes of hundreds or even thousands of years are desirable. For example, currently the two Voyager spacecraft (launched in 1977) are in interstellar space, traveling at 3.5 and 3.1 A. U. (astronomical units) per year. One A. U. is $150 \cdot 10^6$ kilometers, while the nearest star Alpha Centauri is 4.3 light years, or approximately 63,000 A. U. from the sun. Near-interstellar space, however, is being explored, and research in breakthrough propulsion physics is being conducted by NASA [14].

Figure 10:
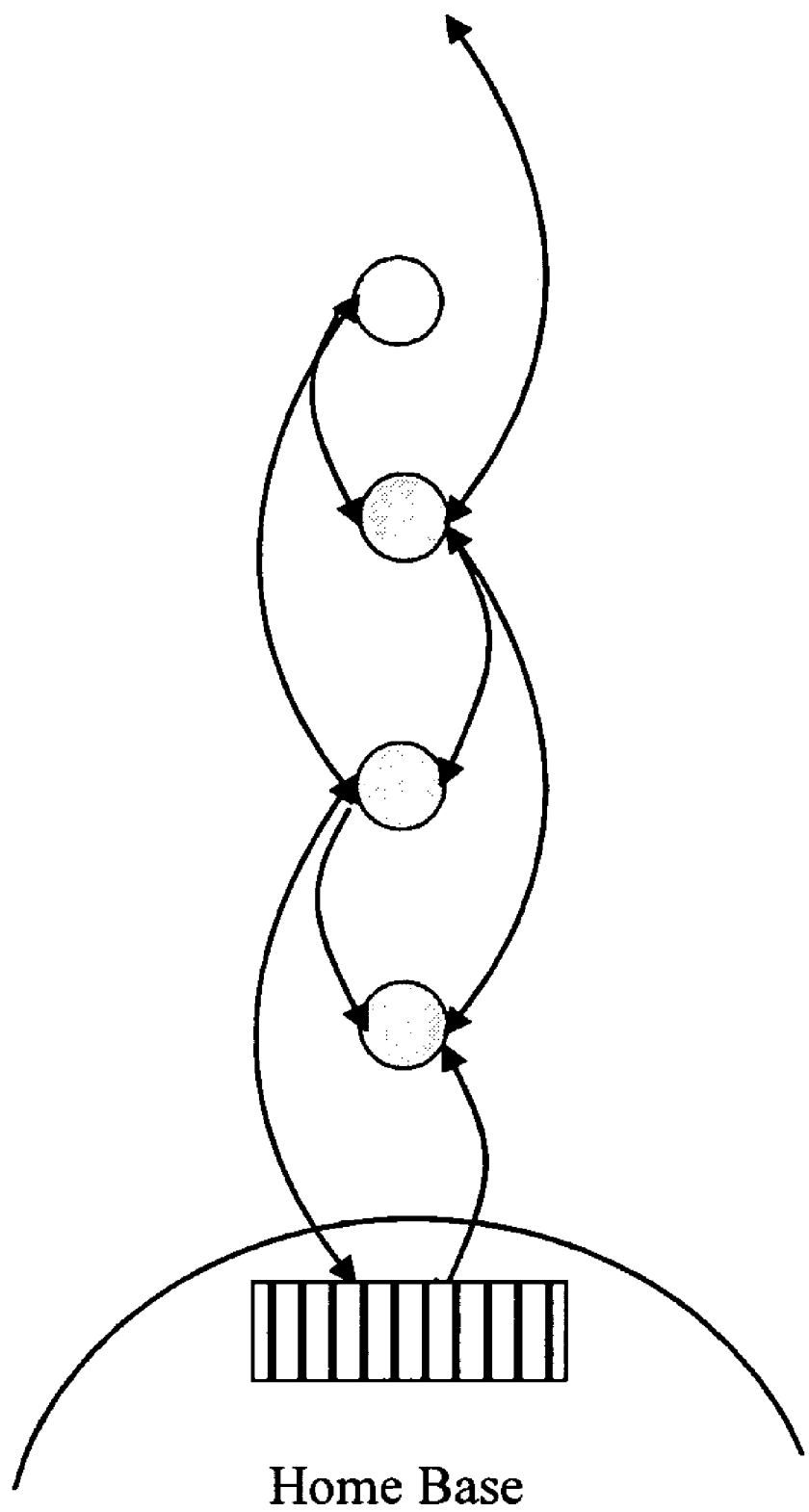
FIG. 10 is a block diagram, highly schematic, of a fault-tolerant chain of interstellar spacecraft embodying certain features of the invention.

An interesting concept is to create a fault-tolerant relay chain of modest-cost DiSTARS type fault-tolerant spacecraft for the exploration of interstellar space. One spacecraft is launched on the same trajectory every n years, where n is chosen to be such that the distance between two successive spacecraft allows reliable communication with two closest neighbors ahead and behind a given spacecraft (FIG. 10). The loss of any one spacecraft does not interrupt the link between the leading spacecraft and Earth, and the chain can be repaired by slowing down all spacecraft ahead of the failed one until the gap is closed.

Additional information appears in A. Avižienis, "The hundred year spacecraft", in *Proc. of the* 1st *NASA/DoD Workshop on Evolvable Hardware*, pages 233-39 (July 1999).

6. Key to the Drawings (a) FIG. 1, 2 and 6—These block diagrams use the following designators in common.

encircled "X": cluster core encircled "M*" (15 in FIG. 1): M-cluster encircled "M" (unshaded; 201*a*, 201*b* and 201*c* in FIG. 2, but 601*a*, 601*b* and 601*c* in FIG. 6): M-node (monitor-node), powered encircled "M" (shaded): M-node, unpowered (spare)

encircled "D" (13 in FIG. 1): D-node encircled "C" (11 in FIG. 1): C-nodes solid black circle with an associated tangential line (14 in FIG. 1): adapter-node (A-node)
solid black circle with an associated through-line (18 in FIG. 1): adapter-port (A-port)
large bold circle (16 in FIG. 1; 202 in FIG. 2): M-bus larger, fine circle (17 in FIG. 1; but 203 in FIG. 2): A-lines
IP: inner-ring power
S in square: power switch
S3: set of S3-nodes.
Additional Item in FIG. 1
12 outer-ring bus
Additional Items in FIG. 6
602 IC-bus
603 disagree lines, internal-error lines, clock lines and replacement-request lines.

(b) FIG. 3—The following explanations apply to the n-bit comparator and switch. Section (1) of the drawing is the symbol only; section (2) shows the detailed structure.
c is an n-bit self-checking comparator
d is a set of n tristate driver gates
if x=y, then e=1 and f=x
if x≠y or if c indicates its own failure,
then e=0 and f=Z (high impedance).

Figure 4B:
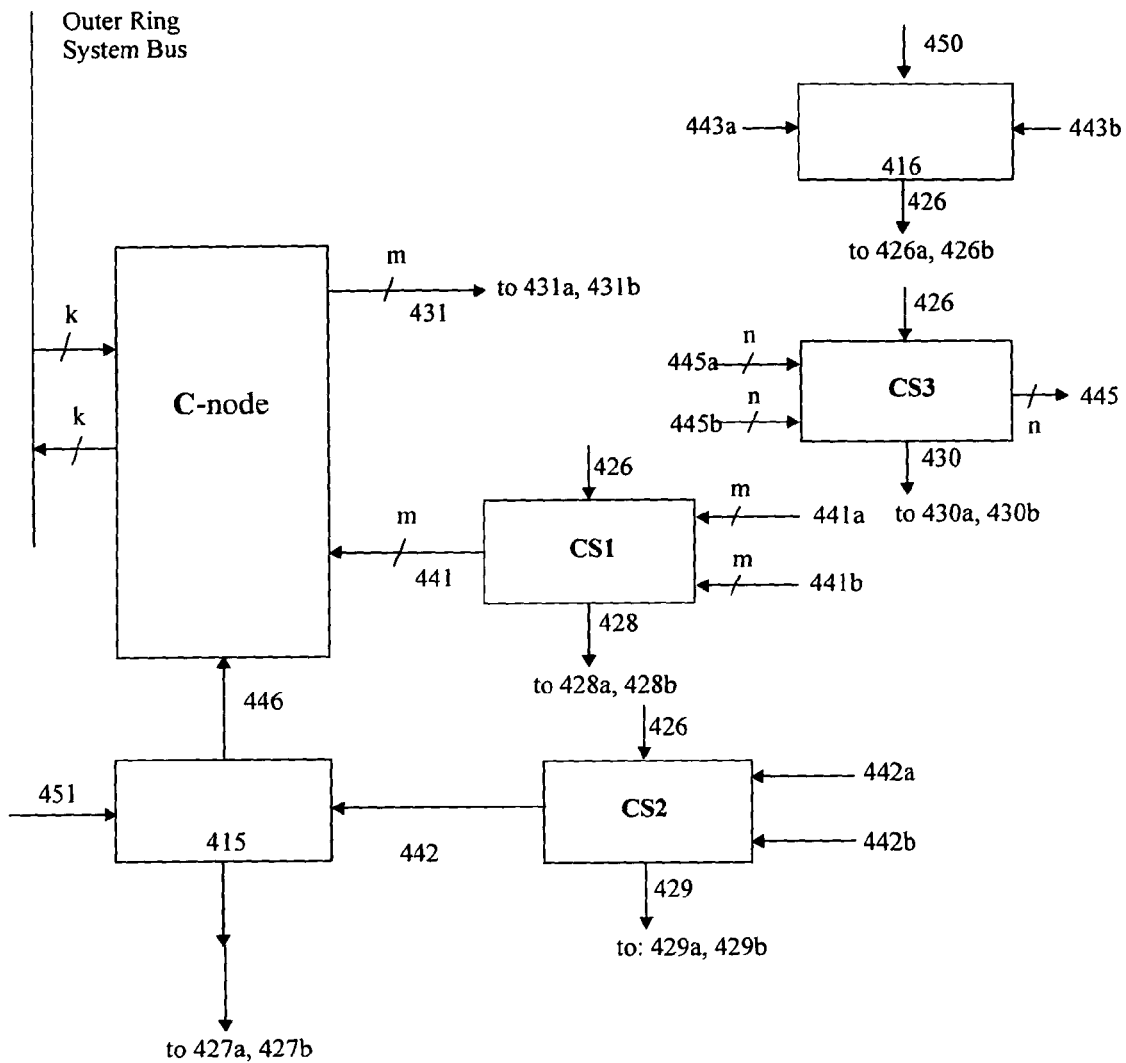

(c) FIG. 4—The following explanations apply to both of FIGS. 4*a* and 4*b*.

Figure 9:
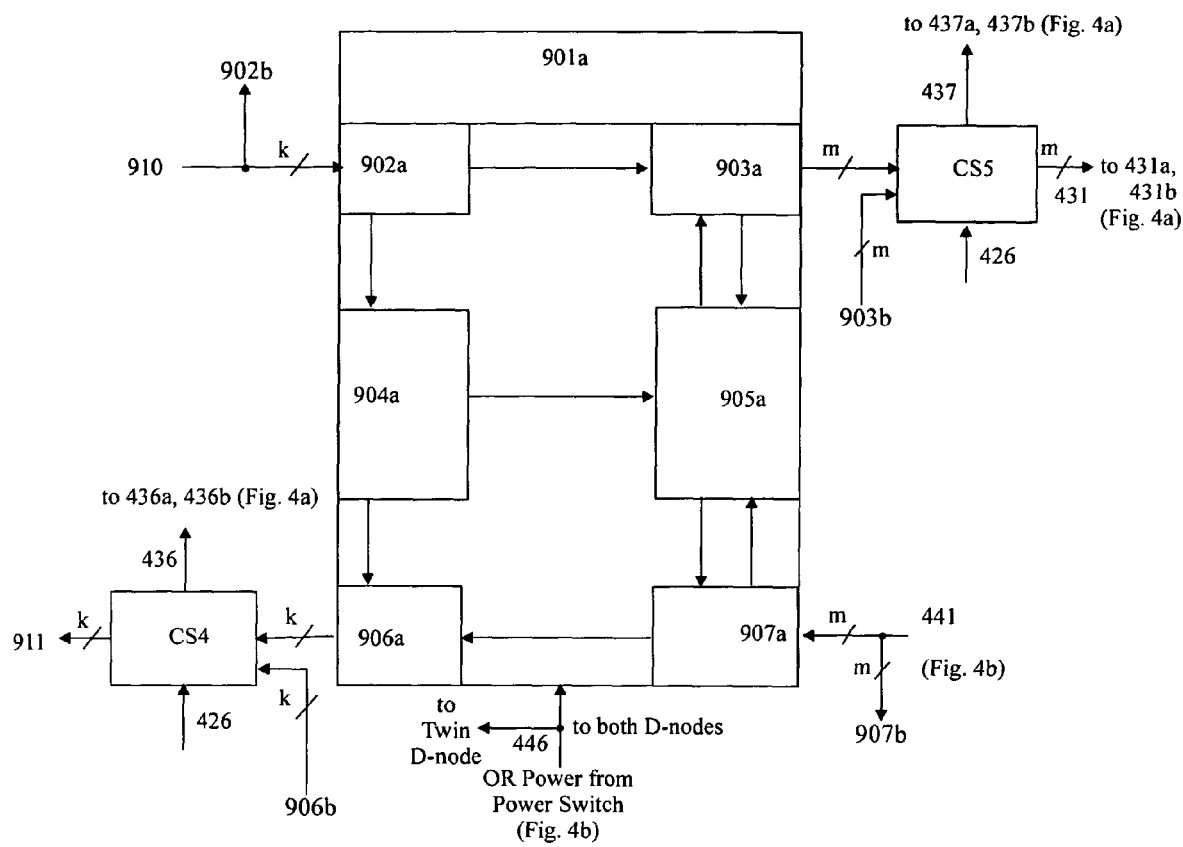
FIG. 9 is a schematic like FIGS. 3 through 5, and 7, but showing one of a self-checking pair of D-nodes, namely node "a" (the identical twin D-node "b" not shown)

| | Internal Blocks: | | Outputs: |
|---|---|---|---|
| 401. | Encoder | 441a. | Messages to C-(or D-) Node via CS 1 |
| 402. | Encoder Register | | |
| 403. | ID Number for A-pair (ROM) | 442a. | Node Power On/Off Command via CS 2 (C- or D-node power) |
| 404. | Comparator (self-checking) | | |
| 405. | Address Register | 443a. | A-node Power Off Command to A-pair Fuse |
| 406. | Decoder | | |
| 407. | Command Register | | |
| 408. | Sequencer | 444a. | A-line to M-nodes (directly) |
| 409. | A-line Encoder & Sequencer | | |
| 410. | Majority Voter | 445a. | Messages to M-nodes via CS 3 and the M-bus |
| 411-414. | Input Registers | | |
| 415. | Outer Ring Power Switch | | |
| 416. | Inner Ring Power Fuse | 446. | Outer Ring Power (to C-node) |
| | Inputs: | | Inputs for A-ports Only: |
| 421a.-424a. | From M-bus | 436a. | Error Signal from CS 4 |
| 425a. | Inner Ring Clock | 437a. | Error Signal from CS 5 (these error signals are shown in FIG. 9) |
| 426a. | Inner Ring Power (via Fuse) | | |
| 427a. | Power Switch Status | | |
| 428a. | Error Signal from CS 1 | | |
| 429a. | Error Signal from CS 2 | | |
| 430a. | Error Signal from CS 3 | | |
| 431a. | Inputs from C-(or D-) node | | |
| 432. | Disagreement Signal from Voter | | |
| 433. | Message from C-(or D-) Node | | |
| 434. | Comparator Output | | |
| 435. | Command to Sequencer | | |
| 450. | Inner Ring Power | | |
| 451. | Outer Ring Power | | |

The Clock (425*a*), Power (426*a*) and Sequencer (408) outputs are connected to all internal blocks. To avoid clutter, those connections are not shown.
Additional note for FIG. 4*a* Elements 436*a*, 437*a* are on the A-ports only.
Additional notes for FIG. 4*b*
(1) The A-nodes a and b, and all blocks shown here (except the C-node), form one ASIC package.

(2) Inputs 443*a* or 443*b* permanently disconnect IR Power from an A-pair.
(3) The input and output numbers refer to FIG. 4*a*.
(d) FIG. 5—Below are explanations for FIG. 5. The Clock (520), Power (533) and Sequencer (508) are connected to all Internal Blocks. To avoid clutter, those connections are not shown.
Internal Blocks:
501. IC-Bus Buffer Storage
502. System Time Register
503. M-Cluster Status Register
504. Outer Ring Status Register
505. ROM Response & Power-up Sequence Store
506. M-bus Buffer Store
507. Input Buffer Store
508. Sequencer (State Machine) and BIST
509. Output Buffer Store
510. A-line Input Buffer Store
511. Power Switch (controlled by k inputs from S3 nodes) that works on the "summation" principle of three-valued inputs: the three possible values of si (i=1, 2, . . . , k) are ON=+1, OFF=−1, tristate=0.
The Switch is ON when $$\sum_{1}^{k} s_i \geq +1.$$

Inputs:
520. Clock from S3 nodes
521. Power Switch Control from S3 nodes (k nodes)
522. M-Bus (n lines)
523.-524. A-lines from first A-pair
525.-526. A-lines from Nth A-pair (the total number of pairs of A-lines is N)
527. "Disagree" signals from other M-nodes (4)
528. Internal or BIST error signals from other M-nodes
529. "Start BIST" command from S3 nodes
530. "Resume TMR" (or Duplex, or Simplex) commands from S3
531. "Power-Up Outer Ring" command from S3
532. IC-Bus (j lines)
533. Inner Ring Power (from switch)
Outputs:
540. to IC-Bus (j lines)
541. to M-Bus (n lines)
542. Power Switch Status to S3 nodes
543. Replacement Request to S3 nodes
544. Internal or BIST error to other M-nodes and S3 nodes
545. "Disagree" signal to other M-nodes and S3 nodes
(e) FIG. 7—The following explanations apply to FIG. 7 only. Outputs 721 through 730 are connected in a wired-"OR" for all four S3 nodes.
Internal Blocks:
701. Fault-Tolerant Clock (one for both a and b sides), connected to all Internal Blocks (connections not shown)
702*a*. System Time Counter
703*a*. Interval Timer (for power-off intervals)
704*a*. Outer Ring Status Register
705*a*. M-Cluster Status Register
706*a*. Sequencer (State Machine) with outputs to all Internal Blocks (connections not shown)
707. Backup Power Source, common for a and b sides (connected to all Internal Blocks, connections not shown)
Inputs:

710. Clock signals from 3 other S3 nodes
711. From IC-Bus (j lines)
712. Power Switch Status from M-nodes (5)
713. Internal or BIST error signals from M-nodes (5)
714. "Disagree" signals from M-nodes (5)
715. Replacement Request Signals from M-nodes (5)
716. Power-Off signal from critical event sensors (excessive radiation, power instability, etc.) or from system operator
717. Power-On signal (same sources as 716)
718. Primary Inner Ring Power (connected to all Internal Blocks, connections not shown)
Outputs:
720. Clock signal to 3 other S3 nodes (connected to all Internal Blocks, connections not shown)
721. System Time to IC-Bus
722. Interval Time to IC-Bus
723. Outer Ring Status to IC-Bus
724. M-Cluster Status to IC-Bus
725. "Start BIST" Command to M-nodes
726. "Resume TMR" (or Duplex, or Simplex) command to M-nodes
727. "Power Up Outer Ring" command to M-nodes
728. "M-Cluster is Dead" message to system operator
729. Power Switch control for all A-nodes
730. Power Switch control to M-nodes (5 lines)

Figure 2:
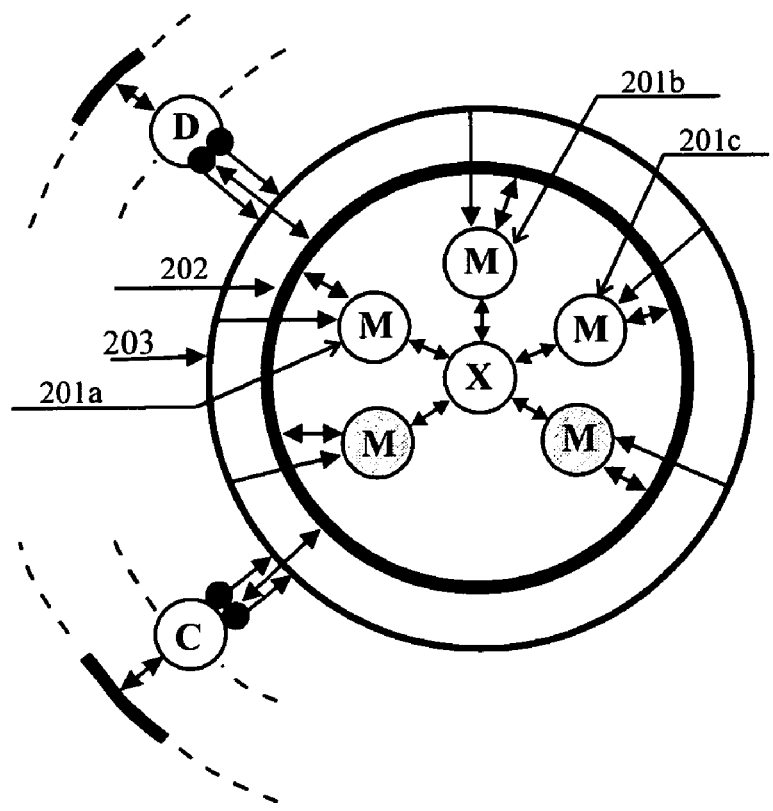
FIG. 2 is a like view, but expanded, of the inner ring including a group of components called the "M-cluster"
Figure 6:
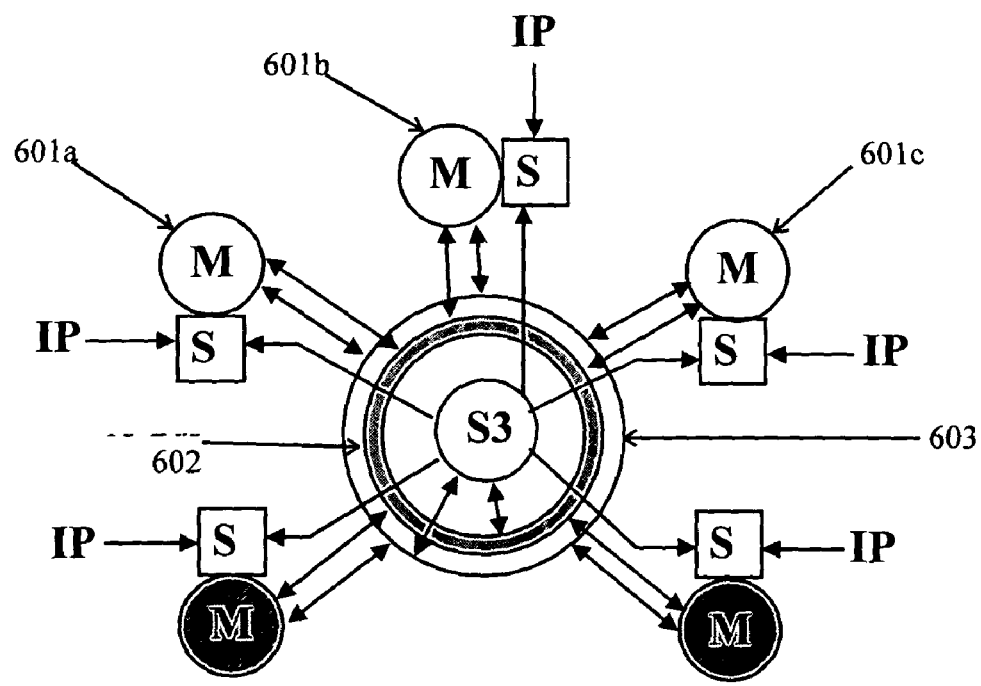
FIG. 6 is a view like FIGS. 1 and 2, but showing the core of the M-cluster.

(f) FIG. 8a—At Start, only the S3-nodes are powered and produce clock signals. There are 3+n unpowered M-nodes, where n is the number of spare M-nodes originally provided. FIGS. 2 and 6 show n=2.

When the Power On sequence is carried out after a preceding Power Off sequence, then the MC-SR contains a record of the M-node status at the Power-Off time, and the M-nodes that were powered then should be tested first.

(g) FIG. 8b—The sequence is repeated for all A-pairs until all C-nodes and D-nodes of the Outer Ring have been tested and the OR-SR (504) contains a complete record of their status. The best sequence is to power on and test the D-nodes first, followed by the top priority (operating system) C-nodes, then the remaining C-nodes. If the number of powered C- and D-nodes is limited, the remaining good nodes are powered off after BIST and recorded as "Spare" in the OR-SR. The OR-SR contents are also transferred to the S3 nodes at the end of the sequence.

(h) FIG. 8c—This sequence is carried out when the input 716 is received by the S3 nodes, i.e., when a catastrophic event is detected or when the DiSTARS is to be put into a dormant state with only the S3 nodes in a powered condition, with System Time (702a) and a power-off Interval Timer (703a) being operated.

(i) FIG. 9—This D-pair replaces the C-node in FIG. 4b to show how the A-ports are connected to the D-nodes. The Twin D-nodes and their A-ports form one ASIC package. The Outer Ring Power 446 and the Sequencer and Clock 901a are connected to all Internal Blocks.
Internal Blocks:
901a. Sequencer and Clock
902a. Input Buffer Store
903a. Encoder of Messages to M-nodes (M-Cluster)
904a. Decision Algorithms: Exact and Inexact (N-Version) Comparators and Voters
905a. Storage Array for D-node Logs
906a. Output Buffer Store
907a. Decoder of Messages from M-Cluster
Inputs:
426 Inner Ring power (via Fuse 416)
441 Messages from A-port to D-node
446 Outer Ring power (from Power Switch 415)
910 Decision Requests and Messages from C-nodes
Outputs:
431 Messages from D-node to M-nodes (via A-ports)
436 Error Signal from CS4
437 Error Signal from CS5
911 Decision Results and Messages to C-nodes To help establish the metes and bounds of the term "substantially", and most particularly the phrase "substantially exclusively" in certain of the appended claims, it is to be understood that the purpose of the broad term "substantially" is to prevent competitors from instituting trivial, i.e. insignificant, changes merely to cynically "get around" the claim language.

This function of the terms "substantially" and "substantially exclusively" is extensively elaborated in the patent-office history of this document, particularly including case-law cited by the Commissioner's representative and discussed in the inventor's responses. The Manual of Patent Examining Procedure states (emphasis added):

"The term 'substantially' is often used . . . to describe a particular characteristic of the claimed invention. It is a broad term."

The decision in the famous Festo case echoes the intended understanding described above—though the present inventor aims to rely at least in part on the term "substantially" rather than only on the now-rather-controversial doctrine of equivalents. Festo says (emphasis added):

"The inventor who chooses to patent an invention and disclose it to the public, rather than exploit it in secret, bears the risk that others will devote their efforts toward exploiting the limits of the patent's language: 'An invention exists most importantly as a tangible structure or a series of drawings. A verbal portrayal is usually an afterthought written to satisfy the requirements of patent law. This conversion of machine to words allows for unintended idea gaps which cannot be satisfactorily filled. Often the invention is novel and words do not exist to describe it. The dictionary does not always keep abreast of the inventor. It cannot. Things are not made for the sake of words, but words for things.' Autogiro Co. of America v. United States, 384 F.2d 391, 397 [155 USPQ2d 697] (Ct. Cl. 1967).

"The language in the patent claims may not capture every nuance of the invention or describe with complete precision the range of its novelty. If patents were always interpreted by their literal terms, their value would be greatly diminished. Unimportant and insubstantial substitutes for certain elements could defeat the patent, and its value to inventors could be destroyed by simple acts of copying."

Here the term "insubstantial", referring to the "substance" of the matter, stands in opposition, or in contrast, to the word "substantially".

It will be understood that the foregoing disclosure is intended to be merely exemplary, and not to limit the scope of invention—which is to be determined by reference to the appended claims.

What is claimed is:

1. An infrastructure for a computing system that has at least one computing node ("C-node") for running at least one application program; said infrastructure being for guarding the system against failure, and comprising:

at least one monitoring node ("M-node") for monitoring the condition of the at least one C-node by waiting for an error signal, indicating incipient such failure, from the at least one C-node and responding to the error signal by sending a recovery command to the at least one C-node;

at least one adapter node ("A-node") for transmitting the error signal and recovery command between the at least one C-node and at least one M-node; and wherein:
the at least one M-node is manufactured, and remains, wholly distinct from the at least one C-node, and
the at least one M-node cannot, and does not, run any application program; and at least one self-checking node for startup, shutdown and survival ("S3-node"), specifically for executing power-on and power-off sequences for such system and for the infrastructure, and for receiving error signals and sending recovery commands to the at least one M-node.

* * * * *